Dec. 10, 1940.  C. T. WHEAT  2,224,418
MUZZLE WEANER
Filed April 3, 1939
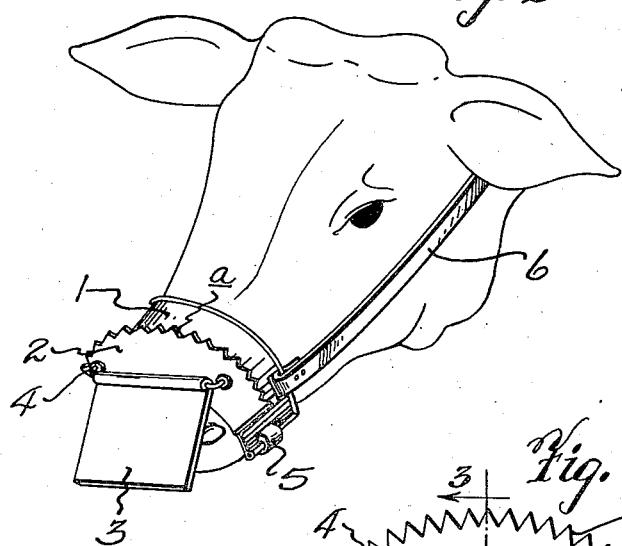
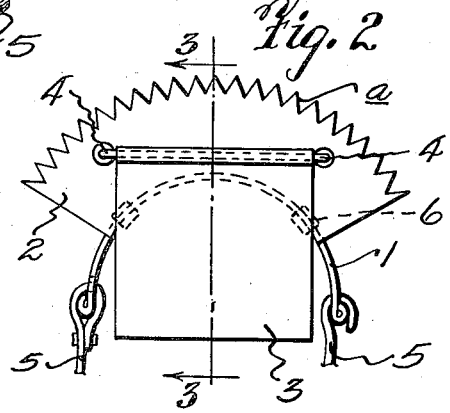
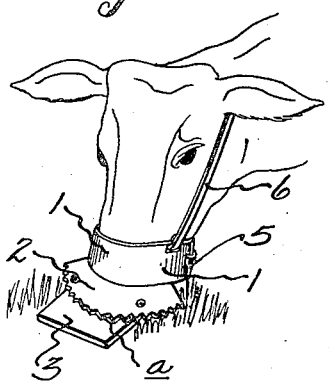
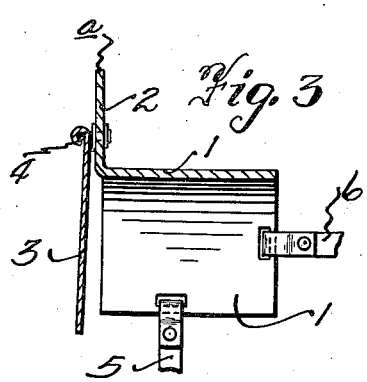
CHARLEY T. WHEAT
INVENTOR.
BY
ATTORNEY.

Patented Dec. 10, 1940

2,224,418

UNITED STATES PATENT OFFICE 2,224,418

MUZZLE WEANER

Charley Thomas Wheat, Mineral Wells, Tex.

Application April 3, 1939, Serial No. 265,754

1 Claim. (Cl. 119—131)

This invention relates to animal muzzles and more particularly to a muzzle adapted to be worn by a suckling calf to prevent its nursing.

The principal object of the invention is to provide a muzzle of the character specified which will not only prevent nursing in order to wean the animal but will likewise prevent it from eating the foliage from stalks of cotton, corn or other products, yet will not prevent normal grazing, drinking or eating.

Another object of the invention resides in the fact that it can be readily applied to the nose of an animal, does not function toward the painful discomfort of the animal in any way and is inexpensive.

With the foregoing objects as paramount, the invention has further reference to lesser objects and to certain salient features of construction and arrangement of parts, to become manifest as the description proceeds, taken in connection with the accompanying drawings wherein:

Figure 1 is a perspective view of the invention in use,

Figure 2 is a front view.

Figure 3 is a side elevation in vertical section on line 3—3 on Figure 2, and

Figure 4 is another perspective view showing the invention in a position to permit the animal to eat or graze.

Continuing with a more detailed description of the drawings, the reference numeral 1 designates a nose conforming member, integral with which is an upturned, circular plate 2, provided with a serrated edge a.

It is desirable that as little discomfort as possible be borne by the animal and to insure this, means in the form of a flap 3, of but a single piece, is hinged by means of a pin 4 to the face of the plate 3 at a point above the level of the curved nose member 1. This flap, when the animal's head is raised, rests against its nose and prevents nursing or feeding off stalks of vegetation such as cotton, corn or the like. Otherwise, the animal may feed by grazing or from feed receptacles with comfort.

The serrated edge of the plate 2 affords sufficient discomfort to the cow as to cause her to object to the calf's nursing, and in a short time, the calf will be weaned and partake only the food permitted by the peculiar construction of the muzzle.

It will be noted also that particular care has been exercised in applying the muzzle to the animal. The chin strap 5 may be loosely applied to allow freedom of the lower jaw of the animal while the head strap 6 positively holds the muzzle against slipping off, without leading to any discomfort by restricting movements of the jaws in eating.

Manifestly, the construction shown and described is capable of some modification and such modification as may be considered within the scope and meaning of the appended claim is also considered within the spirit and intent of the invention.

What is claimed is:

An animal muzzle comprising a member bent to conform to the nose of the animal and an integral curved plate extending outwardly from said member and having a serrated edge, said member having a strap connected to one end thereof to under-reach the lower jaw of the animal and arranged for connection to the opposite end of said member, a head strap engageable in slotted apertures adjacent the ends of said member, and a plate having a hinging point on said serrated plate whereby to lie against the nose of the animal when the latter's head is raised.

CHARLEY THOMAS WHEAT.